United States Patent Office 3,530,171
Patented Sept. 22, 1970

3,530,171
2α-ACYL-3-CARENES AND THEIR DERIVATIVES
David C. Heckert, Oxford, Ohio, assignor to The Procter & Gamble Company, Cincinnati, Ohio, a corporation of Ohio
No Drawing. Continuation-in-part of application Ser. No. 717,390, Mar. 29, 1968. This application July 30, 1968, Ser. No. 748,640
Int. Cl. C07c 69/14, 49/61, 35/22
U.S. Cl. 260—489          7 Claims

ABSTRACT OF THE DISCLOSURE

2α-acyl-3-carenes, their alcohol and ester derivatives, as novel compounds useful as perfume components; and processes for their preparation are disclosed.

This application is a continuation-in-part of applicant's copending application Ser. No. 717,390, filed Mar. 29, 1968.

FIELD OF THE INVENTION

This invention relates to the 2α-acyl-3-carenes, the 2α-(1'-hydroxyalkyl)-3-carenes, and the 2α-(1'-acyloxyalkyl)-3-carenes as novel compounds having valuable odor characteristics and useful as perfume components. In addition this invention relates to a photochemical synthesis of the 2α-acyl-3-carenes by irradiating the 4α-acyl-2-carenes with ultraviolet light and a non-photochemical synthesis of the 2α-acyl-3-carenes by selectively acylating 2-carene in the presence of 3-carene using an acid anhydride or an acid halide with a Friedel-Crafts catalyst. This invention also concerns the synthesis of the 2α-(1'-hydroxyalkyl)-3-carenes and the 2α-(1'-acyloxyalkyl)-3-carenes. The 2α-acyl-3-carenes, their alcohol derivatives, the 2α-(1'-hydroxyalkyl)-3-carenes, and their ester derivatives, the 2α-(1'-acyloxyalkyl)-3-carenes are useful as perfume components in perfume formulations to be used in soap or detergent compositions.

PRIOR ART

E. Alder et al. in East German Pat. 39,693 and M. Muhlstadt and P. Richter in Chem. Ber., 100, 1892–1897 (1967), disclose the reaction of 3-carene with organic acid anhydrides in the presence of a Friedel-Crafts catalyst such as zinc chloride to form the 4α-acyl-2-carenes according to the following schematic representation

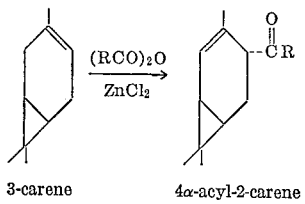

wherein R equals an alkyl group or an aryl group.

Based on the prior art shown above the photochemical conversion of 4α-acyl-2-carenes into the 2α-acyl-3-carenes is heretofore unknown. In addition, the synthesis of the 2α-acyl-2-carenes using 2-carene and an acid anhydride or an acid halide with a Friedel-Crafts catalyst is unknown and unexpected, because of ring destabilizing effects in view of the prior art. The reduction of the 2α-acyl-3-carenes to the 2α-(1'-hydroxyalkyl)-3-carenes and the esterification of the 2α-(1'-hydroxyalkyl)-3-carenes to obtain the 2α-(1'-acyloxyalkyl)-3-carenes are processes heretofore unknown. The 2α-acyl-3-carenes, the 2α-(1'-hydroxyalkyl)-3-carenes and the 2α-(1'-acyloxyalkyl)-3-carenes are all heretofore unknown compounds.

SUMMARY OF THE INVENTION

This invention concerns the 2α-acyl-3-carenes, the 2α-(1'-hydroxyalkyl)-3-carenes, the 2α-(1'-acyloxyalkyl)-3-carenes, as heretofore unknown compounds. These have the following generic formula:

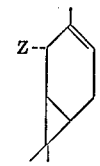

wherein

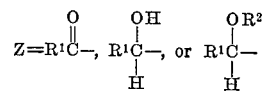

wherein $R^1$ is an alkyl group having from 1 to about 5 carbon atoms and $R^2$ is an acyl group containing from 1 to about 6 carbon atoms.

In addition, this invention concerns a photochemical process for the preparation of the 2α-acyl-3-carenes by the irradiation with ultraviolet light of the 4α-acyl-2-carenes; a process for the preparation of the 2α-acyl-3-carenes by selective acylation of 2-carene with organic acid anhydrides or acid halides in the presence of a Friedel-Crafts catalyst, a process for the preparation of the 2α-(1'-hydroxyalkyl)-3-carenes by reduction of the 2α-acyl-3-carenes, and a process for the preparation of the 2α-(1'-acyloxyalkyl)-3-carenes.

In the photochemical synthesis of the 2α-acyl-3-carenes, the 4α-acyl-2-carenes, either as neat samples or as a solution in an inert solvent, are irradiated with any source of ultraviolet irradiation. The irradiation process is schematically shown by the following:

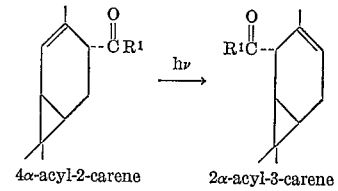

wherein $R^1$ in the above equation is an alkyl group having from 1 to 5 carbon atoms.

In the non-photochemical process for the preparation of the 2α-acyl-3-carenes, 2-carene is reacted with an organic acid anhydride or an acid halide in the presence of a Friedel-Crafts catalyst according to the following:

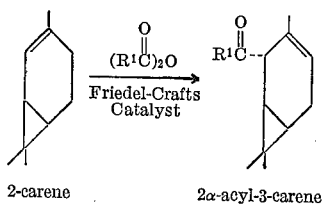

wherein $R^1$ in the above equation is an alkyl group having from 1 to 5 carbon atoms (the $R^1$'s in the above two synthesis, e.g., the photochemical and nonphotochemical synthesis are identical). The above synthesis of the 2α-acyl-3-carenes is quite selective and occurs even in the presence of 3-carene mixtures to the exclusion of the acylation of 3-carene.

The 2α-acyl-3-carenes produced by either the photochemical synthesis or the nonphotochemical synthesis shown above are novel compounds useful as perfume components.

The 2α-acyl-3-carenes can be reduced using known procedures, e.g., using sodium borohydride or a controlled hydrogenation over Raney nickel, to form the alcohol derivatives, the 2α-(1′-hydroxyalkyl)-3-carenes according to the following:

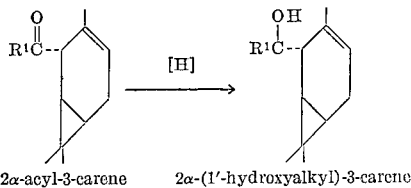

2α-acyl-3-carene   2α-(1′-hydroxyalkyl)-3-carene wherein R¹ above is as hereinbefore defined.

The 2α-(1′ - hydroxyalkyl)-3-carenes can be converted into their ester derivatives by known procedures by reacting the alcohol with the appropriate anhydride or acid halide according to the following equation:

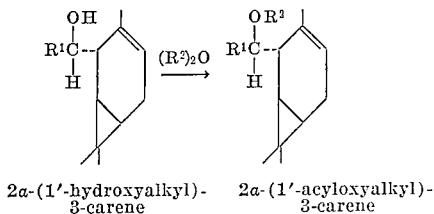

2α-(1′-hydroxyalkyl)-   2α-(1′-acyloxyalkyl)-
3-carene                3-carene wherein $R^1$ is as hereinbefore defined and wherein $R^2$ is an acyl group having from 1 to 6 carbon atoms. The alcohol derivatives, the 2α - (1′hydroxyalkyl)-3-carenes, and the ester derivatives, the 2α-(1′-acyloxyalkyl)-3-carenes are also novel compounds having utility as perfume components.

DESCRIPTION OF THE INVENTION

Preparation of 2α-acyl-3-carenes

Ultraviolet irradiation of 4α-acyl-2-carene

The photochemical process o fthis invention involves the irradiation of the 4α-acyl-2-carenes.

The irradiation of the 4α-acyl-2-carenes to yield the 2α-acyl-3-carenes is a very simple process in that all that is needed is an ultraviolet irradiation source and a container which allows the transmission of ultraviolet light.

Any convenient source of ultraviolet irradiation can be used, i.e., a light source that emits radiation energy at a wavelength distributed in the range of 200 mμ to about 400 mμ. Examples of radiation sources having these characteristics are zinc, cadmium, thallium, gallium, indium, carbon, mercury, zirconium, hydrogen, deuterium, xenon, and helium lamps.

Examples of irradiation sources which are readily and commercially available are the high- and medium-pressure mercury arc lamps, i.e., lamps having a power capacity rating of about 50 watts to about 10,000 watts, preferably having a rationing of about 100 to about 1000 watts, will generate the desired spectral characteristics and are particularly useful as convenient sources of ultraviolet irradiation for use in the photochemical process of this invention. An example of those that are commercially available are the Hanovia mercury arc lamps having a 450-watt medium-pressure mercury arc. In addition to the high- and medium-pressure mercury arc lamps, commercially available low-pressure mercury lamps also can be used in the photochemical process of this invention. For example, those having a power capacity rating of from about 0.5 watt to about 50 watts. These lamps have their principal emission around 253.7 mμ. Other common sources of ultraviolet irradiation, over and above the hereinbefore described sources, which are effective in converting the 4α - acyl - 2 - carenes into the 2α-acyl-3-carenes are the so-called "black light" phosphor lamps having a maximum radiation at 355.0 mμ, "sunlight" phosphor lamps having an irradiation maximum at 310 mμ, typical fluorescent lamps which emit light which extends into the ultraviolet region, and sunlight which has a spectral range extending into the ultraviolet region.

In addition to the hereinbefore-described ultraviolet light sources, immersion lamps which can be actually inserted into the reaction vessel to irradiate the sample of 2α-acyl-3-carene are acceptable as ultraviolet light sources for the purposes of this invention. When this type of irradiation source is used, the irradiation may be carried on in any type of reaction vessel or container.

The reaction vessels which can be used to contain the 4α-acyl-2-carenes with the usual type of external ultraviolet irradiation sources can be simply any container which allows the transmission of light of the desired wavelengths, e.g., quartz, Vycor, Corex, Pyrex, and soft glass reaction vessels can be used. Pyrex reaction vessels are generally preferred for this type of photochemical transformation because of their ready availability.

The irradiation of the 4α-acyl-2-carenes can be accomplished on the neat sample itself or on the 4α-acyl-2-carenes dissolved in an inert solvent. When a solvent is used as a medium for the irradiation a number of different types of solvents can be used, e.g., aliphatic hydrocarbons having from 5 to about 15 carbon atoms, aromatic hydrocarbons having from about 6 to about 20 carbon atoms, alcohols having from 1 to about 15 carbon atoms, ethers having from about 2 to about 15 carbon atoms, and glycols having from 2 to about 15 carbon atoms. Other common solvents which can be used are the chlorinated alkanes, for example, 1,2-dichloroethane. The only limitation is that the solution be substantially homogeneous. In essence any solvent which is liquid at the temperature of operation can be successfully employed in the photochemical process of this invention.

Examples of aliphatic hydrocarbons which can be used are pentane, hexane, octane, decane, dodecane, and pentadecane. Cyclic hydrocarbons can also be used; for example, cyclopentane, cyclohexane and cyclooctane.

Examples of aromatic hydrocarbon solvents which can be used are benzene, xylene, toluene and mesitylene. Pentane, hexane, benzene, xylene and cyclohexane are normally used and are preferred because of their ready availability and nominal cost.

Examples of aliphatic alcohols which can be used are methanol, ethanol, propanol, isopropanol, butanol, pentanol, octanol, decanol, and pentadecanol.

Ethers can also be successfully employed as the solvent for the purposes of this invention. Examples of ethers which can be used are diethylether, dibutylether, dioxane, tetrahydrofuran, and 1,2-dimethoxyethane.

Methanol, ethanol, isopropanol, tetrahydrofuran and dioxane are also preferred as the solvent because of their ready availability.

Examples of suitable glycols which can be used as solvents are ethylene glycol, propylene glycol and butylene glycol.

The conversion process for utraviolet irradiation converting the 4α-acyl-2-carenes into the 2α-acyl-3-carenes occurs from the singlet state and as has hereinbefore been mentioned the conversion of neat samples or samples in solution is possible.

It is also possible to accomplish the ultraviolet transformation in the presence of photosensitizers which will facilitate the transfer of singlet energy. Although not a necessary part of this invention photosensitizers can be used to absorb the emitted spectral radiation energy provided by the ultraviolet light source and to transfer this energy to the 4α-acyl-2-carenes converting them to the 2α-acyl-3-carenes. Examples of photosensitizers which can be used for this purpose in this invention are the aromatic hydrocarbons such as benzene, toluene, xylene, and mesitylene. Biphenyl, naphthalene, and fluorene can also be used as photosensitizers. Other photosensitizers which can be used are phenol, aniline, benzonitrile, and triphenylamine. Where a photosensitizer is used, the preferred photosensitizers are benzene, toluene, and xylene because not only do they facilitate the energy transfer but also they act as a solvent as well.

The 4α-acyl-2-carenes can be dissolved in the solvent at a concentration of about 0.1% to about 75%, preferably at about 1% to about 20%. Any concentration, however, can be used as long as a substantially homogeneous mixture is obtained.

The irradiation is preferably carried out in the absence of air or oxygen, e.g., under a blanket of argon; nitrogen, or helium. This is not a critical consideration. However, operation in the absence of air or oxygen will facilitate the conversion and will minimize any side reactions which might occur. The conversion is also normally carried on with the solvent system being agitated. This can be easily accomplished by bubbling an inert gas, normally the one blanketing the system, through the mixture during the reaction time.

A range of temperatures for irradiation can be used since the irradiation reaction is primarily photochemical in nature rather than thermal. Thus, the reaction temperatures can vary widely, as for example, from about −40° C. to about 100° C., with the preferred temperature range being at or just above room temperature, e.g., from 20° C. to about 35° C. Again the primary consideration is that the contents of the reaction flask be liquid. Where it is desired to conduct the reaction at room temperature, a water bath, fan or the like can be used to control the reaction at room temperature since irradiation with a mercury arc lamp or other ultraviolet source may cause a temperature rise because of the energy emitted in the form of heat.

The reaction time normally required to reach completion is from about 1 minute to about 24 hours, more normally in the neighborhood of about 2 hours. The reaction time required to effect the transformation will depend upon the efficiency of the ultraviolet irradiation source, whether a solvent is used, the reaction vessel used, and the reactant concentration. The point at which no greater yield can be obtained due to continued irradiation can be determined by typical gas chromatographic techniques in accordance with methods well-known in the art.

The components obtained as a result of irradiation of the 4α-acyl-2-carenes, e.g., the 2α-acyl-3-carenes, can be used in perfume compositions which will find ultimate use in products such as soaps, detergents, deodorants, shampoos and the like.

Preparation of the 2α-acyl-3-carenes

Acylation of 2-carene 2-carene can be acylated using a number of organic acid anhydrides and Friedel-Crafts catalysts to obtain the 2α-acyl-3-carenes. 2-carene is a known compound, although it is not readily available. Thus, the 2-carene starting material is normally obtained by reacting 3-carene, which is more easily obtained, with a base such as sodium hydroxide, potassium hydroxide, or alkali metal salts of amines, diamines, dialkyl sulfoxides, and aliphatic alcohols according to the method of G. Ohloff, K. H. Schulte-Elte, and W. Gierisch, Helv. Chim. Acta., 48, 1665 (1965). Reaction of 3-carene with a base results in a 60:40 mixture of 3-carene and 2-carene respectively. This equilibrium mixture can then be reacted with an organic acid anhydride having from about 4 to about 12 carbon atoms, for example acetic anhydride, propionic anhydride, butyric anhydride, pentanoic anhydride, and hexanoic anhydride in the presence of a Friedel-Crafts catalyst, e.g., anhydrous zinc chloride, boron trifluoride, or aluminum chloride. The 2-carene is selectively acylated to the exclusion of the 3-carene. 2α-acyl-3-carene is obtained upon workup.

The 2α-acyl-3-carenes which can be prepared according to this method are identical to those prepared using the photochemical synthesis hereinbefore described. The 2α-acyl-3-carenes which can be prepared by this method are those wherein $R^1$ has from 1 to 5 carbon atoms. Specifically, these would be the 2α-acyl-3-carenes wherein the acyl group is the generic designation for acetyl, propionyl, butyryl, pentanoyl, and hexanoyl. The corresponding anhydrides can be used with acetyl and propionyl anhydrides being preferred because they are commerically available and are easy to use since they are liquid at room temperature.

2-carene can also be acylated using an unsymmetrical acid anhydride, e.g., pentanoyl hexanoate. However, symmetrical anhydrides are preferred because only one reaction product is obtained.

Organic acid halides having from 2 to about 6 carbon atoms, especially the chlorides, bromides and iodides can also be used int he acylation of 3-carene to obtain 2α-acyl-3-carene. Those acyl groups which are preferred where an organic acid anhydride is used in the acylation step are also preferred when an acid halide is used. Organic acid anhydrides are usually preferred because when organic acid halides are used, the corresponding hydrohalic acids are produced and can react with the desired products. Where acid halides are used any tertiary amine, e.g., trimethyl amine or pyridine, can be used to tie up any hydrohalic acid produced to prevent the reaction of the hydrohalic acid with the 2α-acyl-3-carene.

A Friedel-Crafts catalyst is necessary in acylating 2-carene to obtain the 2α-acyl-3-carenes. Typical Friedel-Crafts catalysts can be used in the process of this invention; e.g., zinc chloride, boron trifluoride, and aluminum chloride. Friedel-Crafts catalysts are normally Lewis acids and one skilled in the art can select the appropriate catalyst to accomplish the acylation of 2-carene without departing from the scope and spirit of this invention.

The acylation can be conducted on neat samples, e.g., where the reactants are liquid, or the acylation can be conducted in a solvent. In some instances use of a solvent may be advantageously employed in that when a solvent is used localized concentrations of the Friedel-Crafts catalyst can be minimized more easily. Common solvents for this reaction where a solvent is used include carbon disulfide, nitrobenzene, methylene chloride, and 1,2-dichloroethylene.

The reaction temperature of the acylation of the 2-carene is usually above room temperature but can range from about 15° C. to about 60° C. The acylation is preferably conducted at a moderately low temperature, e.g., at about 15° to 25° C. The reaction time can range from about 30 minutes to about 4 hours more normally in the neighborhood of 2 to 3 hours. The acylation is normally conducted in the absence of air or oxygen by blanketing the system with an inert atmosphere, such as nitrogen, argon or helium. In most cases agitation or stirring of the reaction mixture is advisable. The use of a stirring mechanism, e.g., mechanical or magnetic, is preferred because better agitation can be obtained. In some instances the agitation can be accomplished by bubbling the inert gas used through the system.

Preparation of the 2α-(1'-hydroxyalkyl)-3-carenes

The starting materials, the 2α-acyl-3-carenes, obtained from either the photochemical process or the acylation method, described hereinbefore, can be reduced to the 2α-(1'-hydroxyalkyl)-3-carenes using known procedures. The most common procedure is to use a hydride source such as lithium aluminum hydride, sodium borohydride, potassium borohydride, aluminum hydride or alkyl aluminum hydrides such as diethylaluminum hydride and diisobutyl aluminum hydride, or to use a controlled hydrogenation over Raney nickel. However, any other hydride source which can accomplish the reduction of a carbonyl to an alcohol can be used to prepare the 2α-(1'-hydroxyalkyl)-3-carenes without departing from the scope and spirit of the invention. Lithium aluminum hydride and sodium borohydride are preferred because they are easy to use. The products produced, the 2α-(1'-hydroxyalkyl)-3-carenes are novel compounds useful as perfumes in soap and detergent compositions.

In the process of the preparation of the alcohol derivatives, the 2α-(1'-hydroxyalkyl)-3-carenes, the starting material is normally dissolved in a solvent, although the pure material may be used if desired. Where a solvent is used concentrations of the starting material can range from 0.1% to 100%, preferably about 20%. Suitable solvents are diethyl ether, methylethyl ether, dibutyl ether, dioxane, 1,2-dimethoxyethane and tetrahydrofuran. Aliphatic hydrocarbons such as pentane, hexane, heptane and octane can also be employed as the solvent in preparing the alcohol derivatives. Ether solvents such as diethyl ether or tetrahydrofuran are preferred because of their ready availability.

The solution of the 2α-acyl-3-carenes to be reduced to an alcohol derivative is usually added dropwise into a solution of the hydride source. Solvents such as diethylether, methyl ethyl ether, tetrahydrofuran, and dioxane can be used to form the hydride solution where the hydride source is lithium aluminum hydride; where the hydried source is sodium borohydride, solvents such as water or short chain alcohols, such as methyl alcohol and ethyl alcohol, can be used. Reductions of carbonyl groups with lithium aluminum hydride and sodium borohydride are well-known and one skilled in the art can select the appropriate solvent system.

The hydride source can be dissolved in the solvent used at about 0.1% to a saturated solution. The usual situation is that the hydride source is present both as undissolved material at the bottom of the reaction vessel as well as in solution. As the hydride source reacts with the 2α-acyl-3-carene and the concentration of dissolved hydride is reduced, more of the solid material present at the bottom of the vessel dissolves. Thus, the hydride concentration used is normally of a saturated solution.

The reaction temperature of the reduction can be conducted at a range of temperatures, e.g., from about 20° C. to about 100° C. A reaction temperature at about or just above room temperature is preferred. The reaction is preferably conducted under a blanket of an inert gas, e.g., nitrogen, argon or helium, to prevent oxidation. Again the reactants can be agitated by bubbling of the inert gas through the reaction mixture. The time of the reaction can range from 10 minutes to several hours, more normally around three to four hours. On workup the 2α-(1'-hydroxyalkyl)-3-carenes are obtained.

The 2α-acyl-3-carenes can also be reduced to their alcohol derivatives, the 2α-(1'-hydroxyalkyl)-3-carenes by a controlled hydrogenation over Raney nickel. In the controlled hydrogenation over Raney nickel, the 2α-acyl-3-carenes are normally dissolved in a solvent and the Raney nickel added to the solution. An atmosphere of hydrogen is introduced into the reaction vessel at a moderate pressure and allowed to react reducing the carbonyl group to a hydroxy group.

The solvents which can be used in the reduction using Raney nickel are numerous in scope: e.g., aliphatic alcohols, having from 1 to about 15 carbon atoms, such as methanol, ethanol, propanol, isopropanol, pentanol, octanol, decanol and pentadecanol; ether solvents, having from 2 to about 15 carbon atoms, such as diethyl ether, dimethyl ether, dibutyl ether, dioxane, 1,2-dimethoxyethane, and tetrahydrofuran; aromatic hydrocarbon solvents, having from about 6 to about 20 carbon atoms such as benzene, xylene, toluene and mesitylene; aliphatic hydrocarbon solvents, having from about 5 to about 20 carbon atoms and either straight chain or cyclic, such as pentane, hexane, octane, decane, pentadecane, cyclopentane, cyclohexane, cyclooctane and cyclopentadecane; and glycol solvents, having from 2 to about 15 carbon atoms, such as ethylene glycol, propylene glycol and butylene glycol. Ether solvents and alcohol solvents are preferred.

The hydrogen source can be any of the hydrogen sources which are well-known in the art, for example, that which is commercially available in a pressurized cylinder. The hydrogen can be used at a pressure of from about 14.7 lbs./in.$^2$ to about 50,000 lbs./in.$^2$, normally around 14.7 lbs./in.$^2$. A pressure of about 14.7 lbs./in.$^2$ is preferred because high pressure hydrogenation equipment is unnecessary The reaction temperature during the reduction can range from 20° C. to about 100° C. preferably at about 60° C. The time of the reaction can range from 30 minutes to several hours, more normally about two hours.

The alcohol derivatives of the 2α-acyl-3-carenes which can be prepared in this manner are specifically 2α-(1'-hydroxyethyl)-3-carene, 2α-(1'-hydroxypropyl)-3 - carene, 2α-(1'-hydroxybutyl)-3-carene, 2α-(1'-hydroxypentyl)-3-carene, and 2α-(1'-hyrdroxyhexyl)-3-carene. All of these compounds wherein the hydroxyalkyl group ranges from hydroxyethyl to hydroxyheptyl are novel compounds, are useful as perfume components, either alone or in conjunction with other materials, and can be used in soap and detergent compositions.

Preparation of the 2α-(1'-acyloxyalkyl)-3-carenes

The alcohol derivatives, i.e., the 2α-(1'-hydroxyalkyl)-3-carenes prepared previously by the reaction of a hydride source with the 2α-acyl-3-carenes or with the use of a Raney nickel reduction, can then be esterified using known procedures for converting alcohols to their ester derivatives. In the process of this invention the 2α-(1'-acyloxyalkyl)-3-carenes, wherein the acyloxy group ranges from acetoxy to heptanoyloxy can be prepared and are useful as perfume components, either alone or in conjunction with other perfum materials. Perfume formulations wherein the 2α-(1'-acyloxyalkyl)-3-carenes are employed can be used in soap and detergent compositions.

In the acylation of the hydroxy derivatives, the 2α-(1'-hydroxyalkyl)-3-carenes normally are dissolved in a solvent. Solvents which can be used are water; amines such as trimethyl amine and triethyl amine; herterocyclic nitrogen compounds such as pyridine; aromatic hydrocarbons such as benzene, xylene or toluene; and ether solvents such as diethyl ether, dibutyl ether, methylethyl ether, dioxane, tetrahydrofuran, and 1,2-dimethoxyethane. The choice of the solvent primarily involves consideration of the solubility of the reactants.

In the preparation of the 2α-(1-acyloxyalkyl)-3-carenes, the 2α-(1'-hydroxyalkyl)-3-carenes in solution are reacted with acid anhydrides, having from about 4 to about 12 carbon atoms, or acid halides having from about 2 to about 6 carbon atoms, with acetic and propionic anhydride or halide being preferred. The acid anhydride or the acid halide can be added in the form of a neat sample (e.g., if liquid), or in the form of a solution, as for example, in the previously described solvents which can be used to dissolve the 2α-(1'-hydroxyalkyl)-3-carenes. Again, where an acid halide is used, a solvent, e.g., a tertiary amine such as trimethylamine, should be chosen which will tie up any hydrohalic acid formed to prevent reaction of the hydrohalic acid with the basic carene ring structure. Where an acid anhydride is used, preferred solvents are pyridine, tertiary amines such as trimethylamine, and ether solvents such as diethyl ether and tetrahydrofuran.

The esterification reaction can be run at a temperature range of from about 20° C. to about 100° C. The preferred temperature of conducting the reaction is about 60° C. The reaction time can be from about 30 minutes to several hours, more normally about two hours. Once the reaction is completed, the product, the 2α-(1'-acyloxyalkyl)-3-carenes, is obtained on workup.

The novel compounds of this invention, the 2α-acyl-3-carenes, the 2α-(1'-hydroxyalkyl)-3-carenes, and the 2α-(1'-acyloxyalkyl)-3-carenes can be used separately as odorants or as components with other odorants in perfume compositions which can find their ultimate use in products such as soaps, detergents, deodorants, shampoos and the like at a level of from about 0.1% to about 20%, normally at about 0.2% to about 2%. Perfume compositions containing odoriferously effective amounts, e.g., 0.0001% to about 50%, of any of the hereinbefore-described compounds as perfume components can be used. More specific illustrations of the perfume utility of the compounds of this invention can be found in the examples hereinafter described.

EXAMPLES

General procedure

The following examples illustrate the specific preferred embodiments of this invention and are not intended to be limiting.

All percentages and ratios in the following examples, as well as in the specification and appended claims, are by weight, unless otherwise indicated. The temperatures are expressed in degrees centigrade.

Data listed in all the examples were obtained by means of the following techniques unless otherwise indicated. Optical rotations were measured in hexane, and infrared spectra were obtained on neat samples with a Perkin-Elmer Infracord spectrophotometer. Gas chromatographic analyses were performed on an Aerograph Model 202-B or A-90P instrument using 10-ft. x 0.25-in. columns packed with 20% Carbowax 20M or diethylene glycol succinate on 60-80 mesh Chromosorb W. Nuclear magnetic resonance spectra were determined in deuterated chloroform solution with a Varian Model HA-100 spectrophotometer, using tetramethylsilane as an internal reference. The notation in parenthesis used below to describe each peak of the n.m.r. spectra indicates respectively, multiplicity ($s$=singlet; $d$=doublet; $t$=triplet; $q$=quartet; $m$=multiplet), integration, coupling constant if appropriate, and assignment. Cehmical shifts are recorded as parts per million on the $\tau$ scale, coupling constants at cycles per second. Mass spectra were determined using an Atlas CH-4 or SM-1 spectrometer.

EXAMPLE I

Preparation of 2α-acetyl-3-carene

A solution of 2 g. of 4α-acetyl-2-carene in 150 ml. of benzene was placed in a Vycor irradiation vessel under nitrogen ansd irradiated for 1 hour. During the course of irradiation, with a 654A Hanovia 200-watt lamp, nitrogen was bubbled through the solution. The benzene was distilled off at atmospheric pressure leaving a slightly yellow oil. Gas chromatographic analysis of the oil indicated that it was composed of 34% of the 2α-acetyl-3-carene and 43% of the 4α-acetyl-2-carene. Distillation on an 18 in. spinning band column separated the mixture of 4α-acetyl-2-carene and 2α-acetyl-3-carene (B.P. 53–58°, 0.65 mm. Hg) from the minor products and impurities. Gas chromatographic separation of the two remaining components of the mixture yielded pure 2α-acetyl-3-carene as a colorless oil $[\alpha]_D^{27}$ —396° (c, 1.42); $\lambda_{max}$ 5.85, 8.43μ; $\lambda_{max}$ 279 mμ ($\epsilon$, 118); n.m.r. spectrum: $\tau$ 4.55 ($m$, 1, CH-4) 7.20 ($m$, 1, CH-2), 7.94 ($s$, 3, $CH_3$-12), 8.47 ($m$, 3, $CH_3$-10), 8.97 ($s$, 3, $CH_3$-9), 9.17 ($s$, 3, $CH_3$-8), 9.20–9.40 ($m$, 2, CH-1 and CH-6); m./e.: 178, 161, 149, 135, 133, 119, 105, and 93.

EXAMPLE II

Preparation of 2α-acetyl-3-carene

The procedure of Example I was repeated except that a Hanau NK 6/20 lamp. having a maximum at 253.7 mμ replaced the ultraviolet irradiation source of Example I, and hexane was substituted for the benzene as the solvent. A 27% yield of 2α-acetyl-3-carene was obtained and the product was identical to that obtained in Example I.

EXAMPLE III

Preparation of 2α-acetyl-3-carene

The procedure of Example I was repeated except that a Hanovia S-654 A lamp was used instead of the ultraviolet irradiation source of Example I. A 34% yield of 2α-acetyl-3-carene was obtained and the product was identical to that obtained in Example I.

EXAMPLE IV

Preparation of 2α-acetyl-3-carene

The procedure of Example I was repeated except that a Hanovia S-654 A lamp replaced the ultraviolet irradiation source of Example I and hexane was used as a solvent in the place of benzene. A 24% yield of 2α-acetyl-3-carene was obtained and the product was identical to that obtained in Example I.

EXAMPLE V

Preparation of 2α-acetyl-3-carene

The procedure of Example I was repeated except that a Hanovia S-654 A lamp replaced the ultraviolet irradiation source of Example I and methanol was used as the solvent in the place of benzene. A 34% yield of 2α-acetyl-3-carene was obtained and the product was identical to that obtained in Example I.

EXAMPLE VI

Preparation of 2α-acetyl-3-carene

The procedure of Example I was repeated except that a Hanovia S-654 A lamp replaced the ultraviolet irradiation source of Example I and t-butanol replaced the benzene as the solvent. A 24% yield of 2α-acetyl-3-carene was obtained and the product was identical to that obtained in Example I.

EXAMPLE VII

Preparation of 2α-acetyl-3-carene

The procedure of Example I was repeated except that a circular array of 16 Rayonet RPR 3500 lamps replaced the ultraviolet irradiation source of Example I. A 27% yield of 2α-acetyl-3-carene was obtained and the product was identical to that of Example I.

EXAMPLE VIII

Preparation of 2α-propionyl-3-carene

The procedure of Example I was repeated except that 4α-propionyl-2-carene replaced the 4α-acetyl-2-carene. After irradition, 2α-propionyl-3-carene was obtained in 30% yield. The 2α-propionyl-3-carene was isolated by preparative gas chromatography as a colorless oil, $\lambda_{max}$ 5.83μ; n.m.r. spectrum: $\tau$ 4.46 ($s$, 1, CH-4), 7.50 ($m$, 2, $CH_2$-12), 8.43 ($m$, 3, $CH_3$-10), 8.92 ($s$, 3, $CH_3$-9), 8.93 ($t$, $J$=7$H_3$, 3, $CH_3$-13), 9.12 ($s$, 3, $CH_3$-8), 9.10, 9.40 ($m$, 2, CH-1 and CH-6).

When in Example I and Example VIII above benzene is replaced with the following solvents, substantially equivalent results are obtained in that 2α-acetyl-3-carene or 2α-propionyl-3-carene respectively is obtained: aliphatic hydrocarbon solvents such as pentane, heptane, nonane, decane, dodecane, pentadecane; aromatic hydrocarbons such as toluene, xylene, mesitylene, and fluorene; alcohol solvents such as methanol, ethanol, propanol, isopropanol, butanol, pentanol, octanol, decanol, dodecanol, and pentadecanol; ether solvents such as dimethyl ether, diethyl ether, dibutyl ether, methylethyl ether, 1,2-dimethoxyethane, tetrahydrofuran, and dioxane; and glycols such as ethylene glycol, propylene glycol, and butylene glycol.

When in Examples I through VIII above other 4α-acyl-2-carenes replace either the 4α-acetyl-2-carene of Examples I to VII or the 4α-propionyl-2-carene of Example VIII substantially equivalent results are obtained in that the corresponding 2α-acyl-3-carenes are obtained: e.g., 2α-butyryl-3-carene, 2α-pentanoyl-3-carene, and 2α-hexanoyl-3-carene. When in Examples I through VIII above the solvent is eliminated substantially equivalent results are obtained in that in Examples I to VII 2α-acetyl-3-carene is obtained and in Example VIII 2α-propionyl-3-carene is obtained.

EXAMPLE IX

Preparation of 2α-acetyl-3-carene

A solution of 2.315 g. of biphenyl as a photosensitizer and 0.0907 g. of 4α-acetyl-2-carene in 100 ml. of diethyl ether was irradiated with an Hanau NK 6/20 lamp for 3 hours. Analysis by quantitative and qualitative gas chromatographic techniques indicated that 27% 2α-acetyl-3-carene was formed. Under the conditions of this irradiation the biphenyl absorbed 99.99% of the light at 253.7 mµ. The sample of 2α-acetyl-3-carene was identical to the sample prepared in Example I.

When in Example IX other photosensitizers are substituted on an equivalent basis for the biphenyl, substantially equivalent results are obtained in that 2α-acetyl-3-carene is obtained; e.g., fluorene, naphthalene, benzene, xylene, and toluene.

When in Example IX other 4α-acyl-2-carenes are substituted for 4α-acetyl-2-carene and irradiated either as neat samples or in solution, substantially equivalent results are obtained: e.g., 4α-propionyl-2-carene, 4α-butyryl-2-carene, 4α-pentanoyl-2-carene, and 4α-hexanoyl-2-carene.

Other solvents which can replace the diethyl ether used in Example IX on an equivalent basis are described in more detail on page 7, line 25 to page 8, line 18.

EXAMPLE X

Preparation of 2α-acetyl-3-carene

A solution of 30.3 g. of a 60:40 mixture of 2-carene and 3-carene respectively [prepared according to the method of G. Ohloff, K. H. Schulte-Elte, and W. Giersch, Helv. Chim. Acta. 48, 1665 (1965)] in 47.8 ml. of acetic anhydride was heated to 50° under nitrogen with efficient stirring. A total of 37.6 g. of anhydrous zinc chloride was added portionwise over a 3 hour period, and the mixture was heated for an additional half hour. The resulting solution was diluted with 500 ml. of water and the organic layer was separated. The aqueous layer was extracted with two 100 ml. portions of diethyl ether and the extracts were combined with the previously separated organic layer. The combined organic phases were washed with a saturated solution of sodium carbonate until no further evolution of carbon dioxide was noted. The organic layer was then washed once with water and dried over anhydrous magnesium sulfate. Distillation of the remaining oil gave 15.9 g. (40%) of a colorless oil, B.P. 70–100° (0.4 mm. Hg) which was better than 95% 2α-acetyl-3-carene. Purification of a small sample by preparative gas chromatography [α]$_D^{27}$—379° (c, 1.42) showed the infrared and n.m.r. spectra to be identical to that prepared photochemically in Examples I to VII.

EXAMPLE XI

Preparation of 2α-propionyl-3-carene

A 60:40 mixture of 2-carene and 3-carene, as prepared in Example X above was dissolved in 8.70 ml. of propionic anhydride and stirred at 25° C. under an atmosphere of nitrogen for a period of two hours. During the two hour period a total of 4.96 g. of anhydrous zinc chloride was added in small portions. Once the zinc chloride had been added the mixture was stirred at 50° C. for an additional hour and then poured into 100 ml. of cold water. The mixture was extracted with 200 ml. portions of ethyl ether, and the combined ether extracts were washed with a saturated sodium bicarbonate solution until no further carbon dioxide was evolved. The extract was washed once with water and dried over anhydrous magnesium sulfate. The resulting solution was distilled to obtain 2.38 g. of a colorless liquid, B.P. 51–58° (0.3 mm. Hg), which was shown to be 90% 2α-propionyl-3-carene by gas chromatography. Comparison of this sample by qualitative gas chromatography and infrared techniques indicated that it was identical to the material obtained when 4α-propionyl-2-carene was irradiated as in Example VIII.

When in Example X above acetic anhydride or in Example XI propionic anhydride is replaced on an equivalent basis by other acid anhydrides, substantially equivalent results are obtained in that the corresponding 2α-acyl-3-carenes are prepared; e.g., butyric anhydride, pentanoyl anhydride and hexanoyl anhydride and pentanoyl hexanoyl; or when acid halides replace on an equivalent basis the acetic anhydride of Example X or the propionic anhydride of Example XI with the hydrohalic acid formed being tied up substantially equivalent results are obtained in that the corresponding 2α-acyl-3-carenes are obtained; e.g., acyl halides such as acetyl chloride, propionyl bromide, butyryl iodide, pentanoyl chloride and hexanoyl chloride.

When in Examples X and XI above the zinc chloride is replaced by other Friedel-Crafts catalysts substantially equivalent results are obtained in that 2α-acetyl-3-carene is prepared in Example X and 2α-propionyl-3-carene is prepared in Example XI; e.g., aluminum chloride and boron trifluoride.

When in Example X or XI above a solvent such as carbon disulfide, nitrobenzene, methylene chloride or 1,2-dichloroethylene is used as a solvent, substantially equivalent results are obtained in that 2α-acyl-3-carene or 2α-propionyl-3-carene respectively is obtained.

EXAMPLE XII

Preparation of 2α-(1'-hydroxyethyl)-3-carene

A 4.42 g. sample of 2α-acetyl-3-carene in 30 ml. of diethyl ether was added dropwise to 0.51 g. of lithium aluminum hydride in 100 ml. of ether. The mixture was stirred at room temperature for 3 hours, then a second 100 ml. of ether was added. A total of 2 ml. of water was added dropwise to the stirred solution, and the reaction mixture was stirred for an additional half hour. The inorganic solids were removed by filtration and washed with 250 ml. portions of ether. The ether portions were combined and the ether was removed at atmospheric pressure. The remaining oil was distilled under vacuum to yield 4.04 g. (90%) of a 2α-(2'-hydroxyethyl)-3-carene in the form of a colorless liquid, B.P. 70–77° (1.2 mm. Hg); λ$_{max}$ 2.94, 6.91, 9.31µ; n.m.r. spectrum: τ 4.60 (m, 1, CH–4), 5.90 (dq, 1. J=6H$_3$ and 2H$_3$, CH–11), 8.34 (m, 3, CH$_3$–10), 8.72 (d, 3, J=6H$_3$, CH$_3$–12), 8.98 (s, 3, CH$_3$–9), 9.16 (s, 3, CH$_3$–8), 9.20–9.30 (m, 2, CH–1 and CH–6).

When in Example XII above other 2α-acyl-3-carenes are substituted on an equivalent basis for the 2α-acetyl-3-carene, substantially similar results are obtained in that the 2α-(1'-hydroxyalkyl)-3-carenes are obtained: e.g., where the acyl group in the 2α-acyl-3-carene is propionyl, butyryl, pentanoyl, and hexanoyl, 2α(1'-hydroxypropyl)-3-carene, 2α-(1'-hydroxy-butyl)-3-carene, 2α-(1'-hydroxypentyl)-3-carene, and 2α-(1'-hydroxyhexyl)-3-carene are obtained respectively.

When in Example XII above other hydride sources are substituted on an equivalent basis for the lithium aluminum hydride, substantially equivalent results are obtained in that 2α-(1'-hydroxyethyl)-3-carene is obtained; e.g., sodium borohydride, potassium borohydride, aluminum hydride, and alkyl aluminum hydrides such as diethylaluminum hydride and diisobutylaluminum hydride.

When in Example XII above other solvents are substituted on an equivalent basis for the diethyl ether used, substantially equivalent results are obtained in that 2α-(1'-hydroxyethyl)-3-carene is obtained: e.g., dimethyl ether, methylethyl ether, dibutyl ether, methylpropyl ether, 1,2-dimethoxyethane, tetrahydrofuran, dioxane and aliphatic hydrocarbon solvents such as pentane, hexane and octane. Where sodium borohydride is used as the hydride source in Example XII above water may be used as the solvent to achieve substantially equivalent results.

EXAMPLE XIII

Preparation of 2α-(1'-hydroxyethyl)-3-carene

A solution of 1.78 g. of 2α-acetyl-3-carene in 50 ml. of ethyl alcohol is added to a catalytic amount of Raney nickel (0.01 g. to - g.) and stirred at 60 °in an atmosphere of hydrogen (at 14.7 lbs./in.$^2$) until one equivalent (0.01 mole) of hydrogen is taken up. The catalyst is filtered off, washed with ethyl alcohol and then water. The filtrate is poured into 200 ml. of cold water and extracted with three 100 ml. portions of diethyl ether. The ether extracts are dried over anhydrous magnesium sulfate and distilled to yield 2α-(1'-hydroxyethyl)-3-carene. This sample is identical to that prepared in Example XII.

When in Example XIII above other 2α-acyl-3-carenes are substituted on an equivalent basis for the 2α-acetyl-3-carene, substantially equivalent results are obtained in that the 2α-(1'-hydroxyalkyl)-3-carenes are prepared: e.g., 2α-propionyl-3-carene, 2α-butyryl-3-carene, 2α-pentanoyl-3-carnene and 2α-hexanoyl-3-carene.

When in Example XIII above other solvents are substituted on an equivalent basis for the ethyl alcohol, substantially equivalent results are obtained in that 2α-(1'-hydroxyethyl)-3-carene is prepared: e.g., methyl alcohol, propyl alcohol, isopropyl alcohol, octanol, tetrahydrofuran, dioxane, dimethyl ether, methylethyl ether, dibutyl ether, 1,2-dimethoxyethane, pentane, hexane, cyclopentane, cyclohexane, octane, ethylene glycol, propylene glycol and butylene glycol.

EXAMPLE XIV

Preparation of 2α-(1'-acetoxyethyl)-3-carene

A 1 g. sample of 2α-(1-hydroxyethyl)-3-carene was dissolved in 10 ml. of pyridine. The mixture was cooled in an ice bath and 3 ml. of acetyl chloride was added dropwise. After 3 hours the mixture was poured into 100 ml. of water and extracted with three 100 ml. portions of diethyl ether. The ether extracts were washed with 50 ml. of 2% hydrochloric acid, then with 50 ml. of water, dried over anhydrous magnesium sulfate and distilled to obtain 2α-(1'-acetoxyethyl)-3-carene.

When in Example XIV above other acid halides are substituted on an equivalent basis for acetyl chloride, substantially equivalent results are obtained in that the 2α-(1'-acyloxyethyl)-3-carenes are obtained: e.g., propionyl bromide, butyryl iodide, pentanoyl chloride, and hexanoyl chloride.

When in Example XIV acetyl chloride is replaced on an equivalent basis by an acid anhydride, substantially equivalent results are obtained in that the 2α-(1'-acyloxyethyl)-3-carene are obtained: e.g., acetic anhydride, propionic anhydride, butyric hydride, pentanoyl anhydride and hexanoyl anhydride.

When in Example XIV above other solvents are substituted on an equivalent basis for pyridine, substantially equivalent results are obtained in that 2α-(1'-acetoxyethyl)-3-carene is obtained: e.g., trimethylamine, triethylamine, water, ether solvents such as diethyl ether, dibutyl ether, methylethyl ether, tetrahydrofuran, dioxane, 1,2-dimethoxyethane, and aromatic hydrocarbons such as benzene, toluene and xylene.

When in the Example XIV 2α-(1'-hydroxyalkyl)-3-carenes are substituted on an equivalent basis for 2α-(1'-hydroxyethyl)-3-carenes, substantially equivalent results are obtained in that the 2α-(1'-acetoxyalkyl)-3-carenes are obtained: e.g., 2α-(1'-hydroxypropyl)-3-carene, 2α-(1'-hydroxybutyl)-3-carene, 2α-(1'-hydroxypentyl)-3-carene, 2α-(1'-hydroxyhexyl)-3-carene to obtain respectively 2α-(1'-acetoxypropyl)-3-carene, 2α-(1'-acetoxybutyl)-3-carene, 2α-(1'-acetoxypentyl)-3-carene, and 2α-(1'-acetoxyl)-3-carene.

EXAMPLE XV

The following perfume compositions are made by mixing the components in the amounts designated.

Composition A.—Bergamot artificial

| Component: | Percent by weight |
|---|---|
| Bergamot | 30.0 |
| Terpinyl acetate | 9.0 |
| Linalyl acetate | 6.2 |
| Geranyl acetate | 3.8 |
| Linalool | 7.5 |
| Petitgrain | 12.0 |
| Terpineol | 19.0 |
| Nerolin | 6.0 |
| Decyl aldehyde | 1.5 |
| 2α-(1'-hydroxyethyl)-3-carene [1] | 5.0 |
| | 100.0 |

[1] This compound has a light, fruity, citrus odor.

Composition B.—Jasmine

| Component: | Percent by weight |
|---|---|
| Benzyl acetate | 50.0 |
| Indole | 0.5 |
| Phenyl propyl alcohol | 1.0 |
| Phenyl propyl acetate | 2.0 |
| Hydroxy citronellal | 8.0 |
| Phenyl ethyl alcohol | 15.0 |
| Methyl anthranilate | 1.0 |
| Ylang ylang | 4.0 |
| Linalyl acetate | 3.0 |
| Cinnamic alcohol | 2.5 |
| Amyl cinnamic aldehyde | 6.0 |
| Musk ketone | 2.0 |
| 2α-(1'-hydroxyethyl)-3-carene | 5.0 |
| | 100.0 |

Composition C.—Fougere

| Component: | Percent by weight |
|---|---|
| Lavender oil | 22.0 |
| Coumarin | 10.5 |
| Bergamot | 11.5 |
| Oak moss | 3.5 |
| Patchouli | 0.8 |
| Rose otto synthetic | 1.5 |
| Jasmine synthetic | 0.7 |
| Musk ketone | 3.5 |
| Vetivert | 4.2 |
| Geranium oil | 2.0 |
| Sandalwood | 2.8 |
| Linalyl acetate | 8.5 |
| Benzyl acetate | 1.8 |
| Anisyl acetate | 4.0 |
| Tuberose synthetic | 0.7 |
| Benzoin resin | 3.5 |
| Estragon | 1.0 |
| Angelica root oil | 1.5 |
| Methyl ionone | 7.0 |
| Iso butyl salicylate | 3.5 |
| Methyl salicylate | 0.5 |
| 2α-acetyl-3-carene [1] | 5.0 |
| | 100.0 |

[1] This compound has a resinous, woody odor.

Composition D.—Chypre

| Component: | Percent by weight |
|---|---|
| Cedar wood | 10.0 |
| Geranium oil | 15.0 |
| Bergamot | 15.0 |
| Coumarin | 6.5 |
| Neroli artificial | 6.0 |
| Patchouli | 3.5 |
| Macrocyclic musk | 17.5 |
| Amyl salicylate | 5.0 |
| Jasmine artificial | 6.0 |
| Vanillin | 0.5 |
| Oak moss | 7.5 |

Composition D.—Continued

| Component: | Percent by weight |
|---|---|
| Musk ambrette | 1.0 |
| Orris artificial | 0.5 |
| Musk xylol | 1.0 |
| 2α-propionyl-3-carene [1] | 5.0 |
| Total | 100.0 |

[1] This compound has a resinous, woody odor.

Composition E.—Bergamot artificial

| Component: | Percent by weight |
|---|---|
| Bergamot | 30.0 |
| Terpinyl acetate | 9.0 |
| Linalyl acetate | 6.2 |
| Geranyl acetate | 3.8 |
| Linalool | 7.5 |
| Petitgrain | 12.0 |
| Terpineol | 19.0 |
| Nerolin | 6.0 |
| Decyl aldehyde | 1.5 |
| 2α-(1'-hydroxyethyl)-3-carene | 4.0 |
| 2α-(1'-acetoxyethyl)-3-carene [1] | 1.0 |
| Total | 100.0 |

[1] This compound has a light sweet, fruity, citrus odor.

Composition F.—Jasmine

| Component: | Percent by weight |
|---|---|
| Benzyl acetate | 50.0 |
| Indole | 0.5 |
| Phenyl propyl alcohol | 1.0 |
| Phenyl propyl acetate | 2.0 |
| Hydroxy citronellal | 8.0 |
| Phenyl ethyl alcohol | 15.0 |
| Methyl anthranilate | 1.0 |
| Ylang ylang | 4.0 |
| Linalyl acetate | 3.0 |
| Cinnamic alcohol | 2.5 |
| Amyl cinnamic aldehyde | 6.0 |
| Musk ketone | 2.0 |
| 2α-(1'-hydroxyethyl)-3-carene | 4.0 |
| 2α-(1'-acetoxyethyl)-3-carene | 1.0 |
| Total | 100.0 |

When in Composition A, B, E, and F above other 2α-(1'-hydroxyalkyl)-3-carenes are substituted on an equivalent basis for the 2α-(1'-hydroxyethyl)-3-carene substantially equivalent perfume compositions are obtained: e.g., 2α - (1' - hydroxypropyl) - 3 - carene, 2α - (1' - hydroxybutyl) - 3 - carene, 2α - (1' - hydroxypentyl) - 3 - carene, and 2α-(1'-hydroxyhexyl)-3-carene.

When in Composition C and D above other 2α-acyl-3-carenes are substituted on an equivalent basis for the 2α-acetyl-3-carene or the 2α-propionyl-3-carene, substantially equivalent perfume compositions are obtained: e.g., 2α-butyryl-3-carene, 2α-pentanoyl-3-carene, and 2α-hexanoyl-3-carene.

When in Composition E and F above, other 2α-(1'-acyloxyalkyl)-3-carenes are substituted on an equivalent basis for the 2α-(1'-acetoxyethyl)-3-carene, substantially equivalent perfume compositions are obtained: e.g., 2α-(1' - propionyloxyethyl) - 3 - carene, 2α - (1' - butyryloxyethyl) - 3 - carene, 2α - (1' - pentanoyloxyethyl)-3-carene, and 2α-(1'-hexanoyloxyethyl)-3-carene.

EXAMPLE XVI

Detergent compositions

A conventional, granular, heavy-duty built detergent having the following composition is prepared:

| Component: | Percent by weight |
|---|---|
| Sodium dodecyl benzene sulfonate | 20.0 |
| Sodium tripolyphosphate | 50.0 |
| Sodium silicate (SiO$_2$:Na$_2$O ratio of 2:1) | 6.0 |
| Sodium sulfate | 14.0 |
| Water | 9.8 |
| Perfume Composition A of Example XV | 0.2 |
| Total | 100.0 |

The detergent composition exhibits a highly desirable Bergamot-type fragrance. Composition B, C, D. E. F of Example XV can be substtiuted for Composition A in the above heavy-duty, built detergent. Composition B imparts a jasmine fragrance to the detergent. Composition C imparts a Fougere-type fragrance to the detergent. Composition D imparts a Chypre-type fragrance to the detergent. Composition E imparts a Bergamot-type fragrance. Composition F imparts a jasmine fragrance to the detergent.

EXAMPLE XVII

Soap bar composition

A conventional household soap bar having the following composition is prepared

| Component: | Percent by weight |
|---|---|
| Sodium soap | 75.0 |
| Potassium soap | 7.5 |
| (The total soap comprises a mixture of 80% tallow soap and 20% coconut soap.) | |
| Water | 15.0 |
| Perfume Composition A of Example XV | 2.5 |
| Total | 100.0 |

This soap bar exhibits a highly desirable Bergamot-type fragrance. Composition B, C, D, E, and F of Example XV can be substituted for Composition A in the above soap bar composition. Composition B imparts a jasmine fragrance to the soap bar. Compositin C imparts a Fougere-type fragrance to the soap bar. Composition D imparts a Chypre-type fragrance to the soap bar. Composition E imparts a Bergamot-type fragrance to the soap bar. Composition F imparts a jasmine fragrance to the soap bar.

Of the three slightly different classes of compounds described herein, the members of the class referred to as 2α-acyl-3-carenes each have a resinous, woody odor; the members of the class referred to as 2α-(1'-hydroxyalkyl)-3-carenes each have a light, fruity citrus odor; while each of the members of the third class, the 2α-(1'-acyloxyalkyl)-3-carenes, give off a light, sweet, fruity citrus odor. To those skilled in the perfumery art, these properties are recognized as being valuable notes and fragrances. By using the compounds of the present invention, it is possible to impart these desired odors to perfume compositions or to synthesize a desired fragrance by incorporating varying amounts of the compounds described herein.

What is claimed is:

1. Compounds of the following general formula

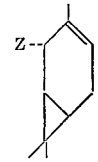

wherein Z is

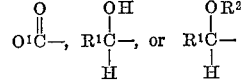

and wherein R$^1$ is an alkyl group having from 1 to about 5 carbon atoms and R$^2$ is an alkanoyl group containing from 1 to about 6 carbon atoms.

2. The compounds of claim 1 wherein Z is

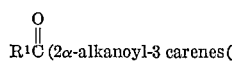
$R^1\overset{O}{\underset{\|}{C}}$ (2α-alkanoyl-3 carenes(

3. The compounds of claim 2 wherein $R^1$ is an alkyl group having from 2 to 3 carbon atoms.

4. The compounds of claim 1 wherein Z is

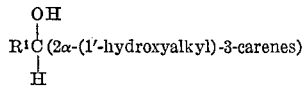
$R^1\underset{H}{\overset{OH}{\underset{|}{\overset{|}{C}}}}$ (2α-(1'-hydroxyalkyl)-3-carenes)

5. The compounds of claim 4 wherein $R^1$ is an alkyl group having from 2 to 3 carbon atoms.

6. The compounds of claim 1 wherein Z is

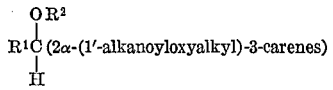
$R^1\underset{H}{\overset{OR^2}{\underset{|}{\overset{|}{C}}}}$ (2α-(1'-alkanoyloxyalkyl)-3-carenes)

7. The compounds of claim 6 wherein $R^1$ is an alkyl group having from 2 to 3 carbon atoms, and wherein $R^2$ is an alkanoyl group having from 2 to 3 carbon atoms.

References Cited

Chem. Abstracts, 51:4316d, 62:7801g, 65:3909g.

LORRAINE A. WEINBERGER, Primary Examiner

V. GARNER, Assistant Examiner

U.S. Cl. X.R.

260—587, 631.5, 469; 252—522; 204—58